(12) United States Patent
Matsumura et al.

(10) Patent No.: US 12,395,226 B2
(45) Date of Patent: Aug. 19, 2025

(54) TERMINAL, COMMUNICATION METHOD, BASE STATION, AND SYSTEM FOR RANDOM ACCESS PROCEDURE

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 360 days.

(21) Appl. No.: 17/265,287

(22) PCT Filed: Aug. 3, 2018

(86) PCT No.: PCT/JP2018/029316
§ 371 (c)(1),
(2) Date: Feb. 2, 2021

(87) PCT Pub. No.: WO2020/026455
PCT Pub. Date: Feb. 6, 2020

(65) Prior Publication Data
US 2021/0307076 A1 Sep. 30, 2021

(51) Int. Cl.
*H04W 74/0833* (2024.01)
(52) U.S. Cl.
CPC .............................. *H04W 74/0833* (2013.01)
(58) Field of Classification Search
CPC ............ H04W 74/0833; H04W 72/046; H04B 7/088; H04B 7/0695; H04L 5/001; H04L 5/0035; H04L 5/005
See application file for complete search history.

(56) References Cited

U.S. PATENT DOCUMENTS

2013/0279437 A1\* 10/2013 Ng ....................... H04L 27/2655
370/329
2014/0119266 A1 5/2014 Ng et al.
(Continued)

FOREIGN PATENT DOCUMENTS

EP 2728787 A2 5/2014
WO 2018/129300 A1 7/2018

OTHER PUBLICATIONS

ASUSTeK, "Remaining issues on beam management", 3GPP TSG RAN WG1 Meeting #93, R1-1807210, May 2018, 9 Pages (Year: 2018).\*

(Continued)

*Primary Examiner* — Gary Mui
*Assistant Examiner* — Yewon Kim
(74) *Attorney, Agent, or Firm* — Osha Bergman Watanabe & Burton LLP

(57) ABSTRACT

In order to assume an appropriate base station beam (TCI state) during a period after an RRC reconfiguration procedure and before MAC CE activation in future radio communication systems, one aspect of a user terminal of the present disclosure includes: a receiving section that receives a PDCCH (Physical Downlink Control Channel) after transmission of an RRC (Radio Resource Control) reconfiguration complete message; and a control section, when the RRC reconfiguration involves a random access procedure, assumes that a synchronization signal block or a channel state information reference signal identified during the random access procedure and the PDCCH are quasi-co-located.

7 Claims, 11 Drawing Sheets

(56) References Cited

U.S. PATENT DOCUMENTS

| | | | |
|---|---|---|---|
| 2015/0103800 A1* | 4/2015 | Seo | H04W 48/16 |
| | | | 370/329 |
| 2020/0059398 A1 | 2/2020 | Pan et al. | |
| 2020/0288479 A1* | 9/2020 | Xi | H04W 72/042 |
| 2020/0288503 A1* | 9/2020 | Sahlin | H04L 5/0053 |

OTHER PUBLICATIONS

Ericsson, "Feature lead summary 3 for beam measurement and reporting", 3GPP TSG-RAN WG1 Meeting #93, R1-1807782, Busan, Korea, May 2018 (Year: 2018).*

Office Action issued in Indian Application No. 202137005598, dated Oct. 17, 2022 (6 pages).

International Search Report issued in Application No. PCT/JP2018/029316, mailed on Oct. 30, 2018 (3 pages).

Written Opinion issued in International Application No. PCT/JP2018/029316, mailed on Oct. 30, 2018 (3 pages).

3GPP TS 36.331 V13.8.1, Release 13; "Evolved Universal Terrestrial Radio Access (E-UTRA); Radio Resource Control (RRC); Protocol specification;" Jan. 2018; Sophia Antipolis Cedex, France (651 pages).

Extended European Search Report in counterpart European Application No. 18 92 8655.2 issued Feb. 21, 2022 (11 pages).

Ericsson; "Feature lead summary 3 for beam measurement and reporting"; 3GPP TSG-RAN WG1 Meeting #93, R1-1807782; Busan, Korea; May 21-25, 2018 (41 pages).

Ericsson; "Remaining issues on beam measurement and reporting"; 3GPP TSG-RAN WG1 Meeting #93, R1-1806217; Busan, Korea; May 21-25, 2018 (13 pages).

Ericsson; "Remaining issues of PDCCH"; 3GPP TSG-RAN WG1 Meeting #93, R1-1807246; Busan, Korea; May 21-25, 2018 (4 pages).

Office Action issued in Japanese Application No. 2020-534033; Dated Jun. 7, 2022 (7 pages).

Office Action issued in Indian Application No. P00202101355, dated Mar. 14, 2023 (7 pages).

Office Action issued in the Chinese Application No. 201880096319.5, mailed on Aug. 30, 2023 (14 pages).

Office Action issued in European Application No. 18928655.2, dated May 17, 2024 (9 pages).

* cited by examiner

TERMINAL, COMMUNICATION METHOD, BASE STATION, AND SYSTEM FOR RANDOM ACCESS PROCEDURE

TECHNICAL FIELD

The present invention relates to a user terminal and a radio communication method in next-generation mobile communication systems.

BACKGROUND ART

In the existing LTE systems (for example, Rel. 13), for example, when a handover is performed, a procedure of RRC (Radio Resource Control) connection reconfiguration is performed in order to change RRC connection.

CITATION LIST

Non-Patent Literature

Non-Patent Literature 1: 3GPP TS 36.331 V13.8.1 "Evolved Universal Terrestrial Radio Access (E-UTRA); Radio Resource Control (RRC); Protocol specification (Release 13)", January 2018

SUMMARY OF INVENTION

Technical Problem

For future radio communication systems (for example, Rel. 15), performing communication by using beamforming is under study. To enhance communication quality using beamforming, controlling at least one of transmission and reception of signals in consideration of a relationship of quasi-co-location (QCL) between a plurality of signals is under study.

For the future radio communication systems, the following is under study: based on a state of a transmission configuration indicator (TCI) (TCI state) indicating (or including) information related to QCL of a control resource set (CORESET), a user terminal controls reception of a downlink control channel (for example, a Physical Downlink Control Channel (PDCCH)) to be mapped to a certain resource unit of the CORESET.

For the future radio communication systems, specifying a TCI state to be applied to the CORESET by using MAC control elements (Medium Access Control Control Elements (MAC CEs)) is also under study.

However, when RRC reconfiguration is performed, a base station beam (TCI state) that the user terminal assumes during a period after an RRC reconfiguration procedure and before MAC CE activation is not disclosed in the future radio systems.

The present invention is made in view of such circumstances, and has one object to provide a user terminal and a radio communication method that can assume an appropriate base station beam (TCI state) during a period after an RRC reconfiguration procedure and before MAC CE activation in future radio communication systems.

Solution to Problem

One aspect of a user terminal of the present invention includes: a receiving section that receives a PDCCH (Physical Downlink Control Channel) after transmission of an RRC (Radio Resource Control) reconfiguration complete message; and a control section, when the RRC reconfiguration involves a random access procedure, assumes that a synchronization signal block or a channel state information reference signal identified during the random access procedure and the PDCCH are quasi-co-located.

Advantageous Effects of Invention

According to the present invention, an appropriate base station beam (TCI state) can be assumed during a period after an RRC reconfiguration procedure and before MAC CE activation in the future radio communication systems.

DESCRIPTION OF EMBODIMENTS (QCL and TCI)

Figure 1:
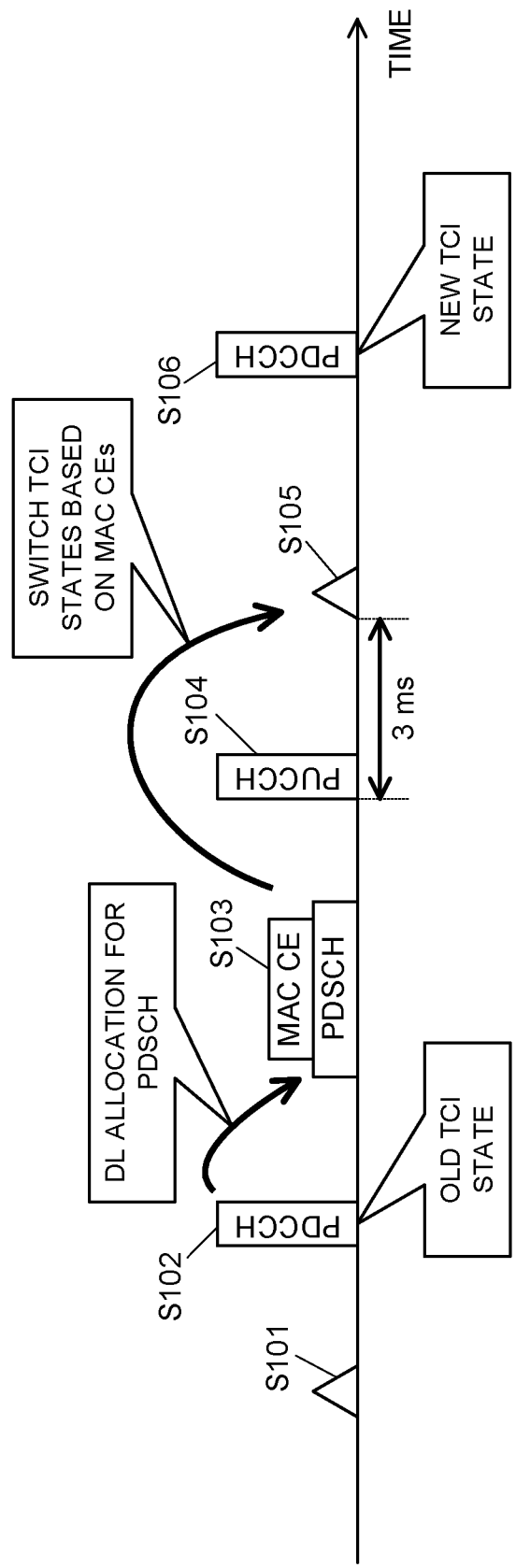
FIG. 1 is a diagram to show an example of beam management for a PDCCH in further radio communication systems.

For the future radio communication systems (for example, Rel. 15), the following is under study: based on information related to quasi-co-location (QCL) of a channel, such as a downlink control channel (Physical Downlink Control Channel (PDCCH)), a downlink shared channel (Physical Downlink Shared Channel (PDSCH)), and an uplink control channel (Physical Uplink Control Channel (PUCCH)), a user terminal controls receiving processes for the channel, such as demapping, demodulation, combining, and receive beamforming, and transmission processes for the channel, such as mapping, modulation, coding, precoding, and transmit beamforming.

Here, QCL is an indicator indicating statistical property of a channel. For example, a case where a certain signal or channel and another signal or channel are in a relationship of QCL may mean that at least one of Doppler shift, Doppler spread, average delay, delay spread, and a spatial parameter (for example, a spatial reception parameter) can be assumed to be the same between such a plurality of different signals or channels.

The spatial reception parameter may correspond to a receive beam, for example, a receive analog beam, of the user terminal, and a beam may be identified based on spatial QCL. QCL or at least one element of QCL in the present disclosure may be interpreted as sQCL (spatial QCL).

For QCL, a plurality of QCL types may be defined. For example, there may be four QCL types (QCL types A to D) having different parameters or parameter sets that can be assumed to be the same.

QCL type A represents QCL with which Doppler shift, Doppler spread, average delay, and delay spread can be assumed to be the same.

QCL type B represents QCL with which Doppler shift and Doppler spread can be assumed to be the same.

QCL type C represents QCL with which average delay and Doppler shift can be assumed to be the same.

QCL type D represents QCL with which a spatial reception parameter can be assumed to be the same.

For the future radio communication systems, control of the transmission and reception processes for the channels based on a state of a transmission configuration indicator (ICI) (TCI state) is under study.

The TCI state may indicate QCL information. Alternatively, the TCI state may include QCL information. At least one of the TCI state and the QCL information may be, for example, information related to QCL between a target channel or a reference signal for the channel and another signal (for example, another downlink reference signal). The information related to QCL may include, for example, at least one of information related to a downlink reference signal to be quasi-co-located (QCL) and information indicating the QCL type described above.

The information related to a downlink reference signal (DL-RS), i.e., a DL-RS-related information, may include at least one of information indicating a DL-RS to be quasi-co-located (QCL) and information indicating resources of the DL-RS. For example, when a plurality of reference signal sets are configured for the user terminal, the DL-RS-related information may indicate at least one of a downlink reference signal to be quasi-co-located (QCL) with a channel or with a port for the channel out of reference signals included in the reference signal sets and resources for the downlink reference signal.

At least one of the reference signal for a channel and the downlink reference signal (DL-RS) may be at least one of a synchronization signal (SS), a broadcast channel (Physical Broadcast Channel (PBCH)), a synchronization signal block (SSB), a mobility reference signal (MRS), a channel state information reference signal (CSI-RS), a demodulation reference signal (DMRS), and a beam-specific signal, or may be a signal configured by enhancing or modifying those described above (for example, a signal configured by modifying at least one of density and a cycle).

For example, the synchronization signal may be at least one of a primary synchronization signal (PSS) and a secondary synchronization signal (SSS). The synchronization signal block (SSB) may be a signal block including a synchronization signal and a broadcast channel. The signal block may be referred to as an SS/PBCH block.

Information related to QCL of a PDCCH or a DMRS antenna port associated with the PDCCH and a certain downlink reference signal (DL-RS) may be referred to as a TCI state for the PDCCH.

The user terminal may determine a TCI state for a UE-specific PDCCH (CORESET), based on RRC signaling and MAC control elements (Medium Access Control Control Elements, MAC CEs).

The control resource set (CORESET) is an allocation candidate region of a control channel, for example, a PDCCH. The CORESET may be configured to include certain frequency domain resources and time domain resources.

The user terminal may receive configuration information of a CORESET from a base station. The user terminal can detect a physical layer control signal by monitoring the CORESET configured for the user terminal itself.

For example, for the user terminal, one or a plurality (K) of TCI states may be configured via higher layer signaling for each CORESET. The user terminal may activate one or a plurality of TCI states for each CORESET by using MAC CEs. The MAC CEs may be referred to as "TCI state indication for UE-specific PDCCH MAC CEs". The user terminal may monitor the CORESET, based on an active TCI state(s) corresponding to the CORESET.

The TCI state may correspond to a beam. For example, the user terminal may assume that PDCCHs of different TCI states are transmitted by using different beams.

Information related to QCL of a PDSCH or a DMRS antenna port associated with the PDSCH and a certain downlink reference signal (DL-RS) may be referred to as a TCI state for the PDSCH.

The user terminal may be given a notification of or configured with M (M≥1) TCI states for the PDSCH, i.e., M pieces of QCL information for the PDSCH, via higher layer signaling. The number M of TCI states configured for the user terminal may be restricted depending on at least one of capability of the user terminal (UE capability) and a QCL type.

Downlink control information (DCI) used for scheduling of the PDSCH may include a certain field indicating a TCI state, i.e., QCL information for the PDSCH. The field may be referred to as a field for a TCI, a TCI field, or a TCI state field. The DCI may be used for scheduling of the PDSCH of one cell, and may be referred to as, for example, DL DCI, DL assignment, DCI format 1_0, or DCI format 1_1.

When DCI includes a TCI field of x bits (for example, x=3), the base station may configure a maximum of 2x (for example, when x=3, $2^3$=8) types of TCI states for the user terminal in advance by using higher layer signaling. A value of the TCI field (TCI field value) in the DCI may indicate one of the TCI states configured in advance via higher layer signaling.

When more than eight types of TCI states are configured for the user terminal, eight or less types of TCI states may be activated or specified by using MAC CEs. The MAC CEs may be referred to as "TCI states activation/deactivation for UE-specific PDSCH MAC CEs". The TCI field value in the DCI may indicate one of the TCI states activated by the MAC CEs.

The user terminal may determine QCL of a PDSCH or a DMRS port of the PDSCH, based on the TCI state indicated by the TCI field value in the DCI. For example, the user terminal may, for example, control receiving processes for the PDSCH, such as decoding and demodulation, assuming that DMRS port(s) or a DMRS port group of the PDSCH in a serving cell is quasi-co-located (QCL) with a downlink reference signal (DL-RS) corresponding to the TCI state notified via DCI.

(Beam Management)

For the future radio communication systems (for example, Rel. 15), a beam management method has been under study. In the beam management, performing beam selection based on L1-RSRP (Layer 1 Reference Signal Received Power) reported by the user terminal is under study. Changing (switching) beams of a certain signal or channel is equivalent to changing TCI states (QCL) of the signal or channel.

A beam selected through beam selection may be a transmit beam (Tx beam) or a receive beam (Rx beam). The beam selected through beam selection may be a beam of the user terminal or a beam of the base station.

The user terminal may include L1-RSRP in channel state information (CSI) to report the L1-RSRP by using an uplink control channel (PUCCH) or an uplink shared channel (Physical Uplink Shared Channel (PUSCH)).

The channel state information (CSI) may include at least one of a channel quality indicator (CQI), a precoding matrix indicator (PMI), a CSI-RS resource indicator (CRI), an SS/PBCH block resource indicator (SS/PBCH Block Indicator (SSBRI)), a layer indicator (LI), a rank indicator (RI), and L1-RSRP.

Measurement results reported for beam management, for example, CSI, may be referred to as a beam measurement, beam measurement results, or a beam measurement report.

The user terminal may measure a channel state by using resources for CSI measurement, and may thereby derive L1-RSRP. The resources for CSI measurement may be, for example, at least one of SS/PBCH block resources, CSI-RS resources, and other reference signal resources. Configuration information of a CSI measurement report may be configured for the user terminal by using higher layer signaling.

The configuration information of a CSI measurement report (CSI-MeasConfig or CSI-ResourceConfig) may include information, such as one or more non zero power (NZP) CSI-RS resource sets for CSI measurement (NZP-CSI-RS-ResourceSet), one or more zero power (ZP) CSI-RS resource sets therefor (ZP-CSI-RS-ResourceSet) (or CSI-IM (Interference Management) resource sets (CSI-IM-ResourceSet)), and one or more SS/PBCH block resource sets (CSI-SSB-ResourceSet).

Information of each resource set may include information related to repetition in resources in the resource set. The information related to repetition may indicate, for example, "on" or "off". "On" may be represented by "enabled" (or "valid"). "Off" may be represented by "disabled" (or "invalid").

Regarding a resource set configured with repetition "on", the user terminal may assume that the resources in the resource set have been transmitted by using the same downlink spatial domain transmission filter. In this case, the user terminal may assume that the resources in the resource set have been transmitted by using the same beam (for example, by using the same beam from the same base station).

Regarding a resource set configured with repetition "off", the user terminal may perform control that the user terminal must not assume or need not assume that the resources in the resource set have been transmitted by using the same downlink spatial domain transmission filter. In this case, the user terminal may assume that the resources in the resource set are not to be transmitted by using the same beam, i.e., that the resources have been transmitted by using a different beam. Specifically, regarding the resource set configured with repetition "off", the user terminal may assume that the base station performs beam sweeping.

FIG. 1 is a diagram to show an example of beam management for the PDCCH in the future radio communication systems (for example, Rel. 15). A network (for example, a base station) determines to switch TCI states for a PDCCH of a certain user terminal (Step S101).

The base station transmits, to the user terminal, DCI for scheduling of a PDSCH by using a PDCCH based on an old TCI state before switching (Step S102).

The base station includes TCI state indication for UE-specific PDCCH MAC CEs in the PDSCH to transmit the TCI state indication for UE-specific PDCCH MAC CEs (Step S103).

When the user terminal detects the DCI, the user terminal decodes the PDSCH, and thereby acquires the MAC CEs. When the user terminal receives the MAC CEs, the user terminal includes retransmission control information (Hybrid Automatic Repeat Request Acknowledgement (HARQ-ACK)) for the PDSCH that has provided the MAC CEs in uplink control information (UCI) by using a PUCCH, for example, to transmit the HARQ-ACK (Step S104).

After 3 [ms] has elapsed from a slot used to transmit the HARQ-ACK, the user terminal applies an activation command of a TCI state based on the MAC CEs (Step S105).

The base station transmits a PDCCH based on a new TCI state after switching (Step S106). The user terminal receives and decodes the PDCCH.

In this manner, when one or more TCI states are configured on the PDCCH or the PDSCH in beam management in the future radio communication systems (for example, Rel. 15), the TCI state(s) is selected based on MAC CEs.

When RRC reconfiguration is performed in order to switch beams, a base station beam (TCI state) that the user terminal assumes during a period after an RRC reconfiguration procedure and before MAC CE activation is not disclosed.

In view of this, the inventors of the present invention carried out detailed examination on a base station beam (TCI state) that the user terminal assumes during a period after an RRC reconfiguration procedure and before MAC CE activation when RRC reconfiguration is performed in order to switch beams.

The present embodiments will be described in detail with reference to the drawings as follows.

(First Aspect)

The first aspect discusses default QCL for the PDCCH during a period after RRC reconfiguration and before MAC CE activation.

For example, it may be assumed that default QCL assumption in a period after configuration of a TCI state for a CORESET based on an RRC control element "TCI-StatesPDCCH" and before MAC CE activation of the TCI state for the CORESET depends on implementation of the user terminal.

However, making such assumption depend on implementation of the user terminal may cause inconsistency between the base station and the user terminal, and is thus not preferable.

Alternatively, it may be assumed that, in a period after configuration of a TCI state for at least one CORESET other than CORESET #0 or CORESET BFR (Beam Failure Recovery) based on the RRC control element "TCI-StatesPDCCH" and before MAC CE activation of the TCI state for the CORESET, the user terminal makes assumption as illustrated in the following (1) to (3).

(1) When RRC reconfiguration involving a related (succeeding) random access procedure is employed, the user terminal may assume that the PDCCH is quasi-co-located (QCL) based on a synchronization signal block (SSB) or a CSI-RS identified during the random access procedure.

(2) When RRC reconfiguration not involving a related random access procedure is employed, the user terminal may assume that the user terminal conforms to the latest MAC CEs indicating a TCI state for the PDCCH in the CORESET.

(3) When no related random access procedure is involved and the preceding MAC CEs do not indicate a TCI state, the user terminal may assume that the user terminal is not expected to receive the PDCCH on the CORESET.

Figure 2:
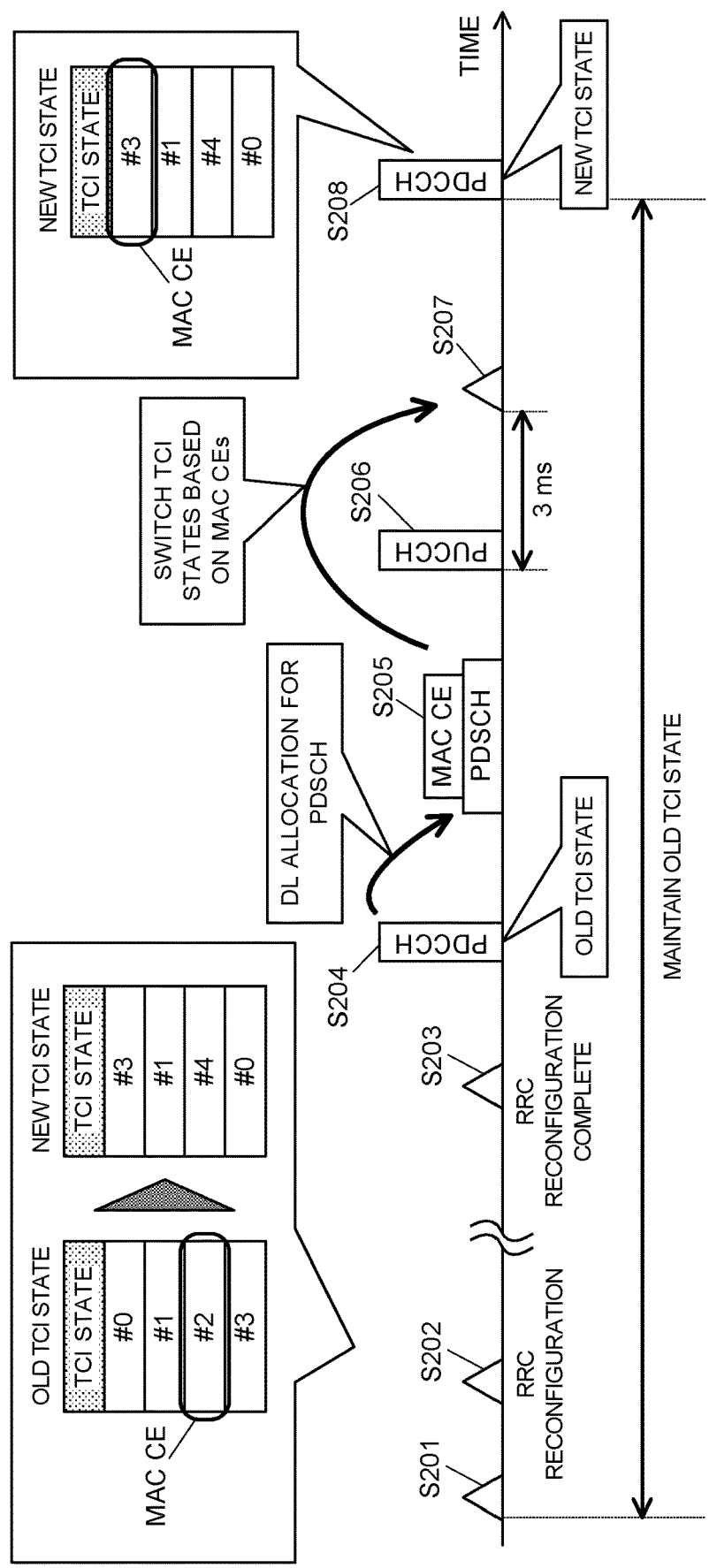
FIG. 2 is a diagram to show an example of a case where one or more TCI states are reconfigured via RRC.

FIG. 2 is a diagram to show an example of a case where one or more TCI states are reconfigured via RRC, on the basis of the above description. A network (for example, a base station) determines to switch TCI states for a PDCCH of a certain user terminal (Step S201).

The base station initiates an RRC reconfiguration procedure in order to switch beams, and transmits an RRC reconfiguration message (RRCReconfiguration) including RRC control element "TCI-StatesPDCCH" to the user terminal (Step S202).

When the user terminal transmits a complete message (RRCReconfigurationComplete) to the base station, the RRC reconfiguration procedure completes (Step S203).

The base station transmits, to the user terminal, DCI for scheduling of a PDSCH by using a PDCCH based on an old TCI state before switching (in FIG. 2, TCI state #2) (Step S204).

The base station includes TCI state indication for UE-specific PDCCH MAC CEs in the PDSCH to transmit the TCI state indication for UE-specific PDCCH MAC CEs (Step S205).

When the user terminal detects the DCI, the user terminal decodes the PDSCH, and thereby acquires the MAC CEs. When the user terminal receives the MAC CEs, the user terminal includes a HARQ-ACK for the PDSCH that has provided the MAC CEs in UCI by using a PUCCH, for example, to transmit the HARQ-ACK (Step S206).

After 3 [ms] has elapsed from a slot used to transmit the HARQ-ACK, the user terminal applies an activation command of a TCI state based on the MAC CEs (Step S207).

The base station transmits a PDCCH based on a new TCI state after switching (in FIG. 2, TCI state #3) (Step S208). The user terminal receives and decodes the PDCCH.

According to the example shown in FIG. 2, during a period from determination of performing RRC reconfiguration in order to switch beams (Step S201) to application of MAC CE activation (Step S208), the network needs to continuously maintain the old TCI state.

According to the example shown in FIG. 2, when RRC reconfiguration is performed in order to switch beams, MAC CES need to be transmitted again on a beam of the old TCI state after RRC reconfiguration is completed.

Alternatively, it may be assumed that a default TCI state in a period after configuration of a TCI state for a CORESET based on RRC control element "TCI-StatesPDCCH" and before MAC CE activation of the TCI state for the CORESET is provided based on the smallest entry, the smallest ID, the certain number-th entry, or the certain number-th ID of the RRC control element "TCI-StatesPDCCH" for the CORESET.

Figure 3:
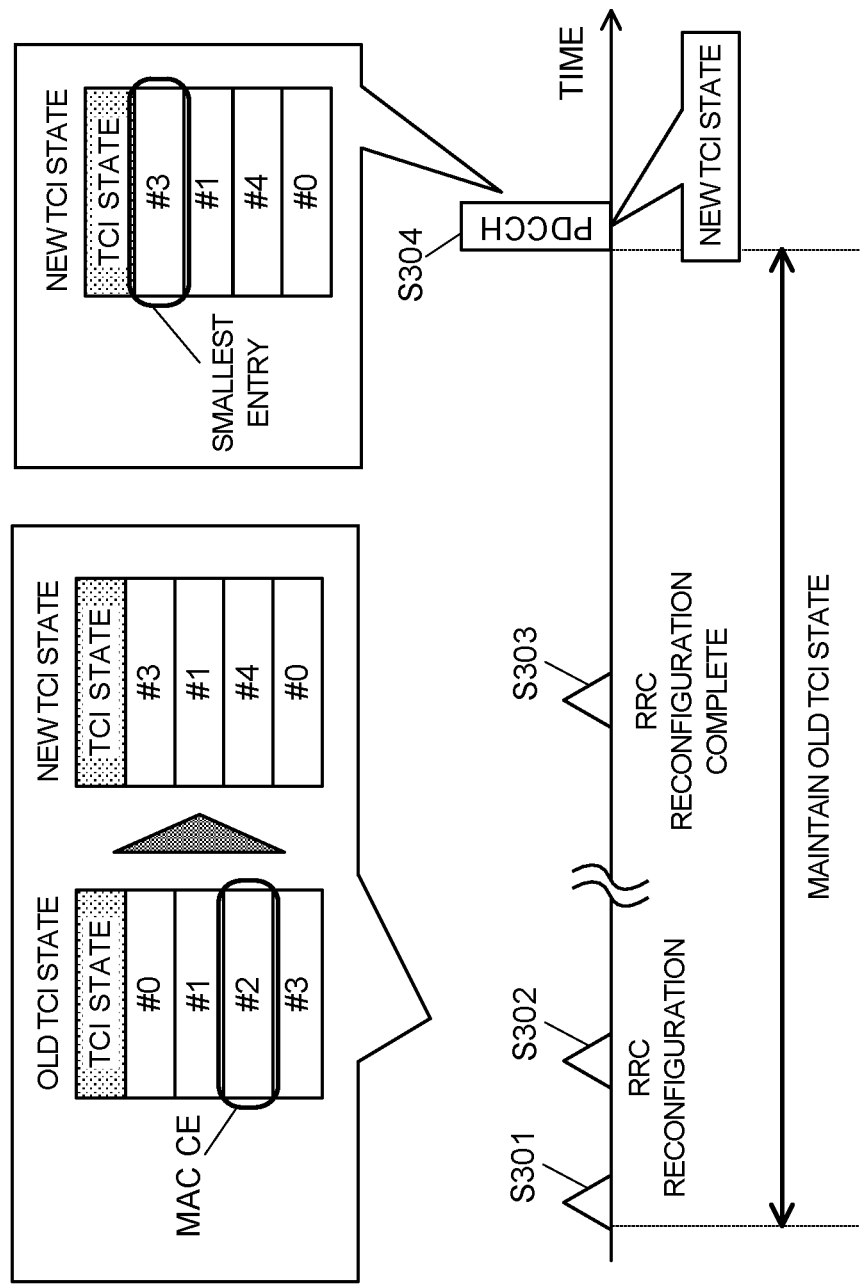
FIG. 3 is a diagram to show an example of a case where one or more TCI states are reconfigured via RRC.

FIG. 3 is a diagram to show an example of a case where one or more TCI states are reconfigured via RRC, on the basis of the above description. A network (for example, a base station) determines to switch TCI states for a PDCCH of a certain user terminal (Step S301).

The base station initiates an RRC reconfiguration procedure in order to switch beams, and transmits an RRC reconfiguration message (RRCReconfiguration) including RRC control element "TCI-StatesPDCCH" to the user terminal (Step S302).

When the user terminal transmits a complete message (RRCReconfigurationComplete) to the base station, the RRC reconfiguration procedure completes (Step S303).

The base station transmits a PDCCH based on a new TCI state after switching to the user terminal (Step S304). The base station assumes a certain beam (in FIG. 3, TCI state #3 being the smallest entry) that is included in the RRC control element "TCI-StatesPDCCH".

According to the example shown in FIG. 3, in comparison with the case shown in FIG. 2, the period in which the network continuously maintains the old TCI state can be shortened. This is beneficial to the network.

Figure 4:
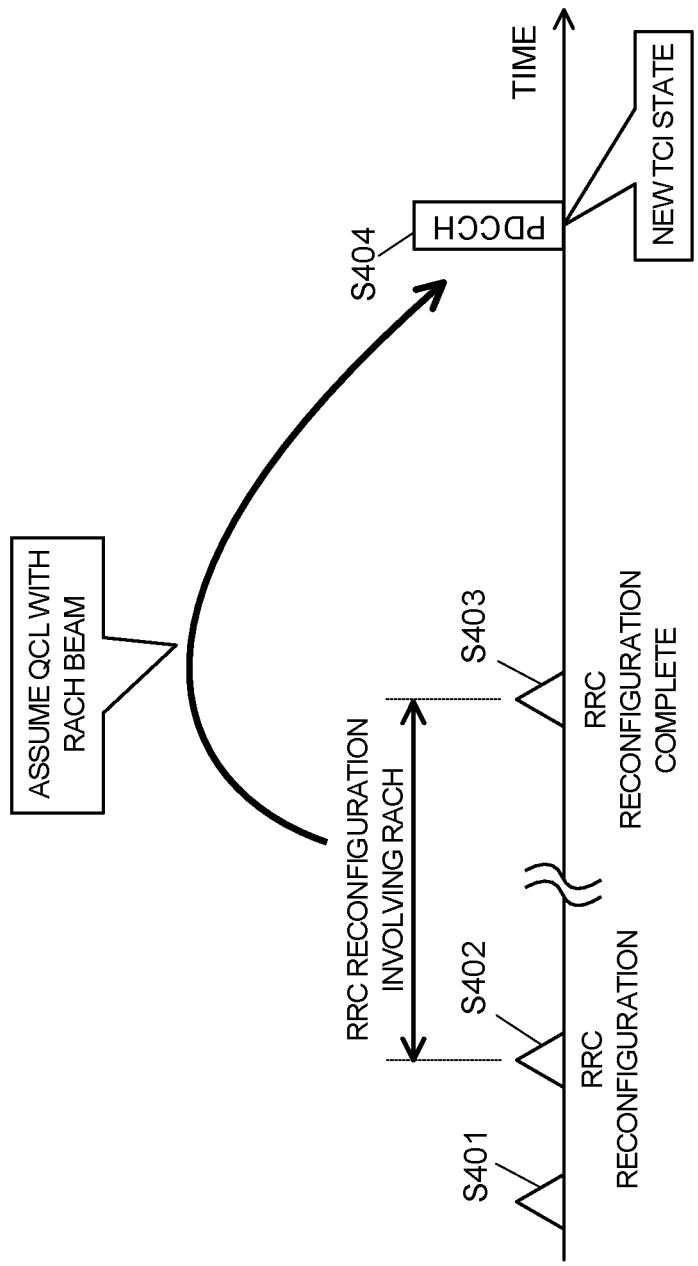
FIG. 4 is a diagram to show an example of beam management for a PDCCH according to a first aspect.
Figure 5:
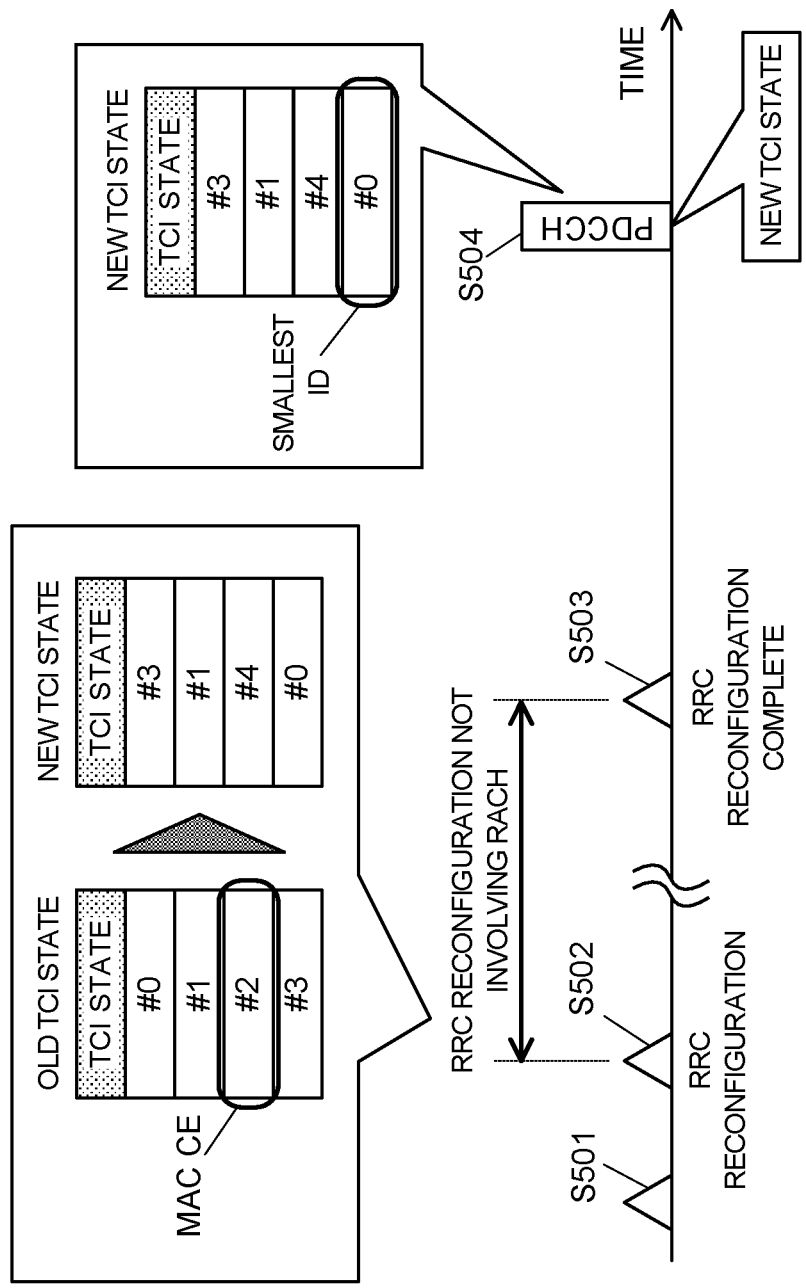
FIG. 5 is a diagram to show an example of beam management for a PDCCH according to the first aspect.

On the basis of the above, the user terminal according to the first aspect may assume a base station beam (TCI state) for the PDCCH during a period after RRC reconfiguration and before MAC CE activation as in the manner shown in FIG. 4 and FIG. 5.

FIG. 4 and FIG. 5 are each a diagram to show an example of beam management for the PDCCH according to the first aspect.

As shown in FIG. 4, when RRC reconfiguration involving a related (succeeding) random access procedure is employed, the user terminal may assume that a synchronization signal block (SSB) or a CSI-RS identified during the random access procedure and the PDCCH are quasi-co-located (QCL).

As shown in FIG. 5, when RRC reconfiguration not involving a related random access procedure is employed, the user terminal may assume that the PDCCH is quasi-co-located (QCL) with a certain beam in RRC control element "TCI-StatesPDCCH" for the CORESET. For example, the user terminal may assume that the PDSCH is quasi-co-located (QCL) with a TCI state provided based on the smallest ID of the RRC control element "TCI-StatesPDCCH" for the CORESET.

In the example shown in FIG. 4, a network (for example, a base station) determines to switch TCI states for a PDCCH of a certain user terminal (Step S401).

The base station initiates an RRC reconfiguration procedure involving a RACH, such as a handover, in order to switch beams, and transmits an RRC reconfiguration message (RRCReconfiguration) including RRC control element "TCI-StatesPDCCH" to the user terminal (Step S402).

When the user terminal transmits a complete message (RRCReconfigurationComplete) to the base station, the RRC reconfiguration procedure completes (Step S403).

The base station transmits a PDCCH based on a new TCI state after switching to the user terminal (Step S404). The base station transmits the PDCCH, assuming QCL with a RACH beam.

In the example shown in FIG. 5, a network (for example, a base station) determines to switch TCI states for a PDCCH of a certain user terminal (Step S501).

The base station initiates an RRC reconfiguration procedure not involving a RACH in order to switch beams, and transmits an RRC reconfiguration message (RRCReconfiguration) including RRC control element "TCI-StatesPDCCH" to the user terminal (Step S502).

When the user terminal transmits a complete message (RRCReconfigurationComplete) to the base station, the RRC reconfiguration procedure completes (Step S503).

The base station transmits a PDCCH based on a new TCI state after switching to the user terminal (Step S504). The base station assumes a certain beam (in FIG. 5, TCI state #0 being the smallest ID) included in the RRC control element "TCI-StatesPDCCH".

According to the examples shown in FIG. 4 and FIG. 5, when RRC reconfiguration is performed in order to switch beams, MAC CES need not be transmitted again on a beam of the old TCI state after RRC reconfiguration completes, and thus beams can be switched rapidly and appropriately.

According to the first aspect, a base station beam (TCI state) for the PDCCH that the user terminal assumes during a period after an RRC reconfiguration procedure and before MAC CE activation when RRC reconfiguration is performed in order to switch beams has been disclosed.

(Second Aspect)

The second aspect discusses default QCL for the PUCCH during a period after RRC reconfiguration and before MAC CE activation.

Regarding the PUCCH, spatial relation may correspond to a TCI state. In the future radio communication systems (for example, Rel. 15), spacial relation information between a certain reference signal and the PUCCH can be included in PUCCH configuration information (PUCCH-Config information element) of RRC. The certain reference signal is at least one of a synchronization signal block (SSB), a CSI-RS, and a sounding reference signal (SRS).

When spatial relation information between a synchronization signal block (SSB) or a CSI-RS and the PUCCH is configured for the user terminal, the user terminal may transmit the PUCCH by using a spatial domain filter that is the same as a spatial domain filter for reception of the synchronization signal block (SSB) or the CSI-RS. In this case, the user terminal may assume that a UE receive beam of the synchronization signal block (SSB) or the CSI-RS and a UE transmit beam of the PUCCH are the same.

For example, it may be assumed that, in a period after RRC reconfiguration based on RRC control element "PUCCH-SpatialRelationInfo" or after a beam failure recovery, a radio link failure (RLF), or a handover and before a single MAC CE activation of spatial relation in "PUCCH-SpatialRelationInfo", the user terminal assumes default spatial relation for PUCCH transmission as follows.

When transmission of a random access channel (Physical Random Access Channel (PRACH)) is involved, the user terminal may assume that the user terminal conforms to spatial relation for PRACH or message 3 transmission.

When no PRACH transmission is involved, the user terminal may assume that the user terminal conforms to the latest MAC CES indicating spatial relation of PUCCH resources.

Alternatively, it may be assumed that default spatial relation of the PUCCH resources in a period after RRC reconfiguration and before its succeeding MAC CE activation is provided based on the smallest entry, the smallest index, the certain number-th entry, or the certain number-th index of the RRC control element "PUCCH-SpatialRelationInfo".

On the basis of the above, it may be assumed that the user terminal according to the second aspect assumes default spatial relation for the PUCCH during a period after RRC reconfiguration and before MAC CE activation as follows.

(Option 1)

In option 1, regarding a PUCCH beam, the user terminal may assume in a similar manner to the PDCCH.

When RRC reconfiguration involving a related (succeeding) random access procedure is employed, the user terminal may assume that the PUCCH is quasi-co-located (QCL) based on a synchronization signal block (SSB) or a CSI-RS identified during the random access procedure.

When RRC reconfiguration not involving a related random access procedure is employed, the user terminal may assume QCL provided based on the smallest index in RRC control element "PUCCH-SpatialRelation InfoId".

(Option 2)

In option 2, regarding a PUCCH beam, the user terminal may reuse a mechanism before RRC configuration.

When RRC reconfiguration involving a related (succeeding) random access procedure is employed, the user terminal may assume that the user terminal reuses a beam determination mechanism before RRC configuration.

When RRC reconfiguration not involving a related random access procedure is employed, the user terminal may assume QCL provided based on the smallest index in RRC control element "PUCCH-SpatialRelation InfoId".

Spatial configuration for PUCCH transmission is provided based on RRC control element (higher layer parameter) "PUCCH-SpatialRelationInfo", in a case that the user terminal is configured with a single value for RRC control elements (higher layer parameter) "PUCCH-SpatialRelationInfoId". Otherwise, the spatial configuration is provided based on RRC control elements (higher layer parameters) "PUCCH-SpatialRelationInfo" among a set of a plurality of values provided based on RRC control element (higher layer parameter) "PUCCH-SpatialRelationInfoId".

According to the second aspect, a base station beam (spatial relation) for the PUCCH that the user terminal assumes during a period after an RRC reconfiguration procedure and before MAC CE activation when RRC reconfiguration is performed in order to switch beams has been disclosed.

(Radio Communication System)

Hereinafter, a structure of a radio communication system according to the present embodiment will be described. In the radio communication system, the radio communication method according to the embodiment described above is applied.

Figure 6:
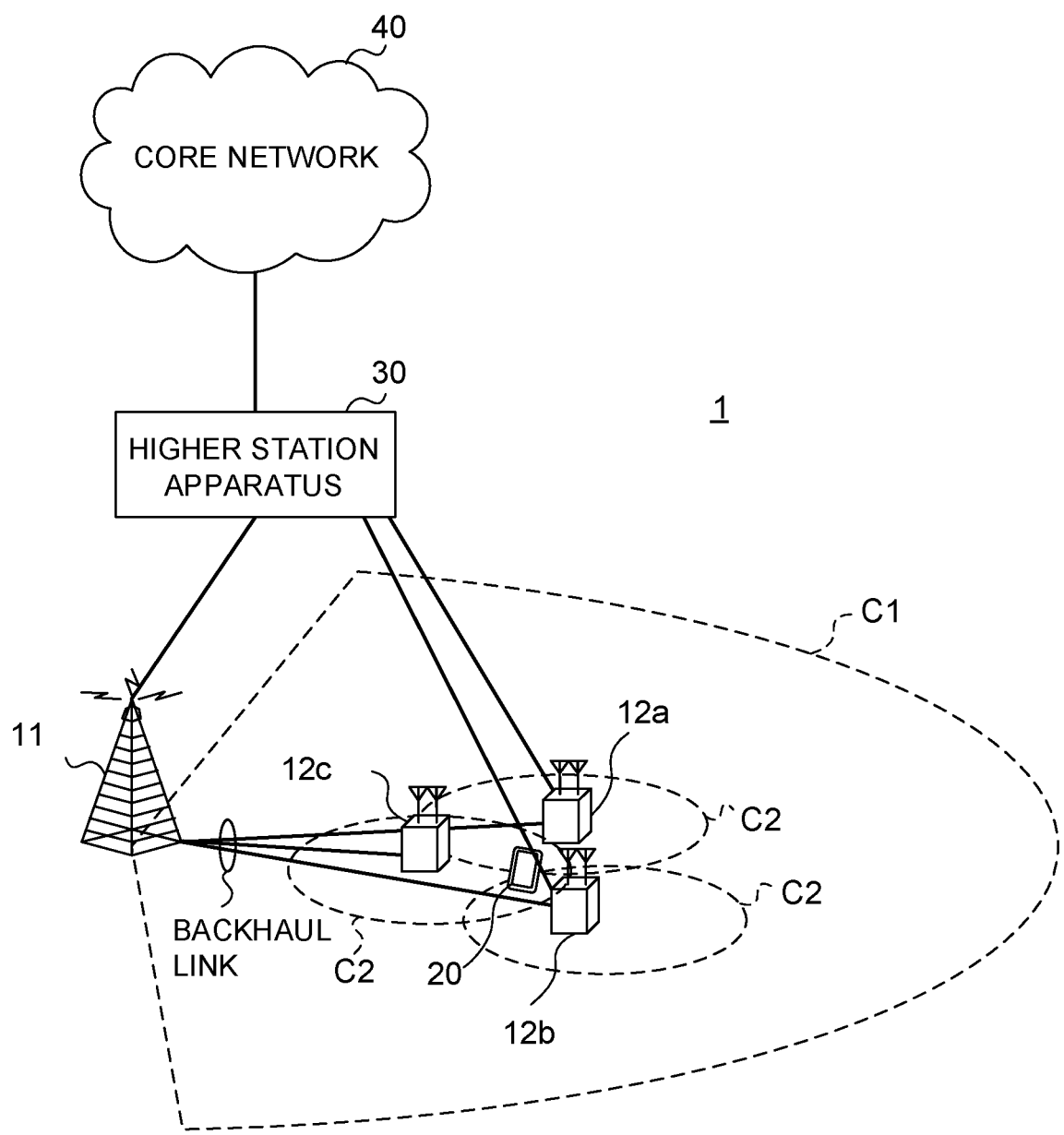
FIG. 6 is a diagram to show an example of a schematic structure of a radio communication system according to the present embodiment.

FIG. 6 is a diagram to show an example of a schematic structure of the radio communication system according to the present embodiment. A radio communication system 1 can adopt carrier aggregation (CA) or dual connectivity (DC) to group a plurality of fundamental frequency blocks (component carriers) into one, where the system bandwidth in an LTE system (for example, 20 MHz) constitutes one unit. The radio communication system 1 may be referred to as SUPER 3G, LTE-A (LTE-Advanced), IMT-Advanced, 4G, 5G, FRA (Future Radio Access), NR (New RAT), or the like.

The radio communication system 1 includes a base station 11 that forms a macro cell C1, and base stations 12a to 12c that form small cells C2, which are placed within the macro cell C1 and which are narrower than the macro cell C1. User terminals 20 are placed in the macro cell C1 and in each small cell C2. Different numerologies may be applied among cells. The numerology refers to a set of communication parameters that characterizes design of signals of a certain RAT or design of a RAT.

The user terminals 20 can connect with both the base station 11 and the base stations 12. It is assumed that the user terminals 20 use the macro cell C1 and the small cells C2, which use different frequencies, at the same time by means of carrier aggregation (CA) or dual connectivity (DC). The user terminals 20 can adopt carrier aggregation (CA) or dual connectivity (DC) by using a plurality of cells (CCs) (for example, two or more CCs). As the plurality of cells, the user terminals can use a licensed band CC and an unlicensed band CC. A configuration that any of the plurality of cells includes a TDD carrier employing a shortened TTI may be adopted.

Between the user terminals 20 and the base station 11, communication can be carried out by using a carrier of a relatively low frequency band (for example, 2 GHZ) and a narrow bandwidth (referred to as, for example, an "existing carrier," a "Legacy carrier" and so on). Between the user terminals 20 and the base stations 12, a carrier of a relatively high frequency band (for example, 3.5 GHZ, 5 GHZ, 30 to 70 GHZ, and so on) and a wide bandwidth may be used, or the same carrier as that used between the user terminals 20 and the base station 11 may be used. The structure of the frequency band for use in each base station is by no means limited to these.

Connection between the base station 11 and each base station 12 (or between two base stations 12) may be implemented by a configuration enabling wired connection (for example, an optical fiber in compliance with CPRI (Common Public Radio Interface), an X2 interface, and so on), or enabling radio connection.

The base station 11 and the base stations 12 are each connected with a higher station apparatus 30, and are connected with a core network 40 via the higher station apparatus 30. The higher station apparatus 30 may be, for example, access gateway apparatus, a radio network controller (RNC), a mobility management entity (MME) and so on, but is by no means limited to these. Each base station 12 may be connected with the higher station apparatus 30 via the base station 11.

The base station 11 is a base station having a relatively wide coverage, and may be referred to as a "macro base station," a "central node," an "eNB (eNodeB)," a "transmission/reception point" and so on. The base stations 12 are base stations having local coverages, and may be referred to as "small base stations," "micro base stations," "pico base stations," "femto base stations," "HeNBs (Home eNodeBs)," "RRHs (Remote Radio Heads)," "transmission/reception points" and so on. Hereinafter, the base stations 11 and 12 will be collectively referred to as "base stations 10," unless specified otherwise.

Each of the user terminals 20 is a terminal that supports various communication schemes such as LTE and LTE-A, and may include not only mobile communication terminals but stationary communication terminals.

In the radio communication system 1, as radio access schemes, OFDMA (orthogonal frequency division multiple access) can be applied to the downlink (DL), and SC-FDMA (single-carrier frequency division multiple access) can be applied to the uplink (UL). OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. The uplink and downlink radio access schemes are by no means limited to the combinations of these, and OFDMA may be used in the UL.

In the radio communication system 1, a downlink data channel (also referred to as a Physical Downlink Shared Channel (PDSCH), downlink shared channel, and so on), which is shared by the user terminals 20, a broadcast channel (Physical Broadcast Channel (PBCH)), L1/L2 control channels and so on, are used as DL channels. User data, higher layer control information, SIBs (System Information Blocks) and so on are communicated on the PDSCH. The MIBs (Master Information Blocks) are communicated on the PBCH.

The L1/L2 control channels include a downlink control channel (a Physical Downlink Control Channel (PDCCH) and an Enhanced Physical Downlink Control Channel (EPDCCH)), a PCFICH (Physical Control Format Indicator Channel), a PHICH (Physical Hybrid-ARQ Indicator Channel) and so on. Downlink control information (DCI), including PDSCH and PUSCH scheduling information, and so on are communicated on the PDCCH. The number of OFDM symbols to use for the PDCCH is communicated on the PCFICH. Transmission confirmation information (ACK/NACK) of a HARQ for the PUSCH is communicated on the PHICH. The EPDCCH is frequency-division multiplexed with the PDSCH (downlink shared data channel) and used to communicate DCI and so on, like the PDCCH.

In the radio communication system 1, an uplink data channel (also referred to as a Physical Uplink Shared Channel (PUSCH), an uplink shared channel, and so on), which is shared by the user terminals 20, an uplink control channel (Physical Uplink Control Channel (PUCCH)), a random access channel (Physical Random Access Channel (PRACH)) and so on are used as UL channels. User data and higher layer control information are communicated on the PUSCH. Uplink control information (UCI) including at least one of transmission confirmation information (ACK/NACK), radio quality information (CQI), and so on is communicated on the PUSCH or the PUCCH. By means of the PRACH, random access preambles for establishing connections with cells are communicated.

<Base Station>

Figure 7:
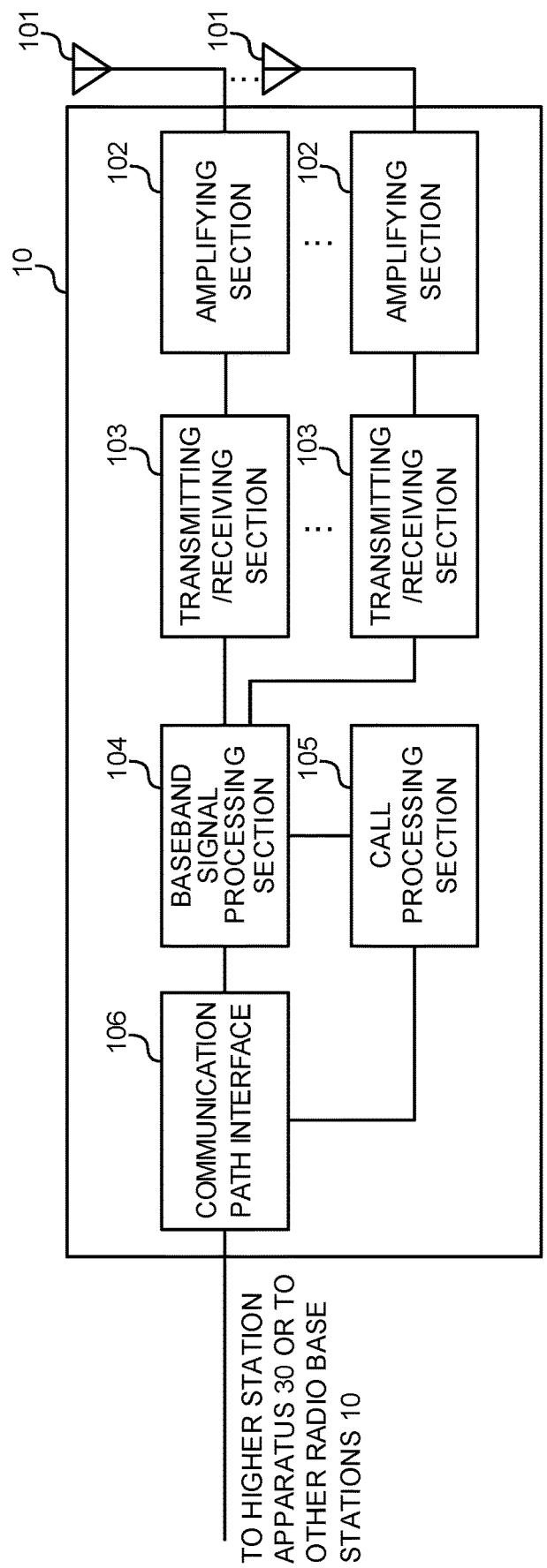
FIG. 7 is a diagram to show an example of a functional structure of a radio base station according to the present embodiment.

FIG. 7 is a diagram to show an example of an overall structure of the base station according to the present embodiment. A base station 10 includes a plurality of transmitting/receiving antennas 101, amplifying sections 102, transmitting/receiving sections 103, a baseband signal processing section 104, a call processing section 105 and a transmission line interface 106. The base station 10 may be configured to include one or more transmitting/receiving antennas 101, one or more amplifying sections 102 and one or more transmitting/receiving sections 103. The base station 10 may be a transmitting apparatus for downlink data and a receiving apparatus for uplink data.

Downlink data to be transmitted from the base station 10 to the user terminal 20 is input from the higher station apparatus 30 to the baseband signal processing section 104, via the transmission line interface 106.

In the baseband signal processing section 104, the downlink data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present invention pertains. The transmitting/receiving section 103 may be structured as a transmitting/receiving section in one entity, or may be constituted with a transmitting section and a receiving section.

As for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing, such as setting up and releasing for communication channels, manages the state of the base station 10, and manages the radio resources.

The transmission line interface 106 transmits and/or receives signals to and/or from the higher station apparatus 30 via a certain interface. The transmission line interface 106 may transmit and/or receive signals (backhaul signaling) with other base stations 10 via an inter-base station interface (for example, an optical fiber in compliance with the CPRI (Common Public Radio Interface) and an X2 interface).

The transmitting/receiving sections 103 may further include analog beamforming sections that perform analog beamforming. The analog beamforming sections can be constituted with analog beamforming circuits (for example, phase shifters and phase shift circuits) or analog beamforming apparatus (for example, phase shifting device) that can be described based on general understanding of the technical field to which the present invention pertains. The transmitting/receiving antennas 101 can be constituted with array antennas, for example. The transmitting/receiving sections 103 are configured to be capable of employing single BF and multi-BF.

The transmitting/receiving sections 103 may transmit signals by using transmit beams, and may receive signals by using receive beams. The transmitting/receiving sections 103 may transmit and receive signals by using certain beams that are determined by the control section 301.

The transmitting/receiving sections 103 transmit downlink signals (for example, a downlink control signal (a downlink control channel), a downlink data signal (a downlink data channel, a downlink shared channel), a downlink reference signal (a DM-RS, a CSI-RS, and so on), a discovery signal, a synchronization signal, a broadcast signal, and so on). The transmitting/receiving sections 103 receives uplink signals (for example, an uplink control signal (an uplink control channel), an uplink data signal (an uplink data channel, an uplink shared channel), an uplink reference signal, and so on).

The transmitting/receiving sections 103 may transmit the PDSCH including the TCI state indication for UE-specific PDCCH MAC CEs to the user terminal 20. The transmitting/receiving sections 103 may receive a HARQ-ACK transmitted by the user terminal 20 that has received the PDSCH.

The transmitting section and the receiving section according to the present invention are constituted with both or any one of the transmitting/receiving section 103 and the transmission line interface 106.

Figure 8:
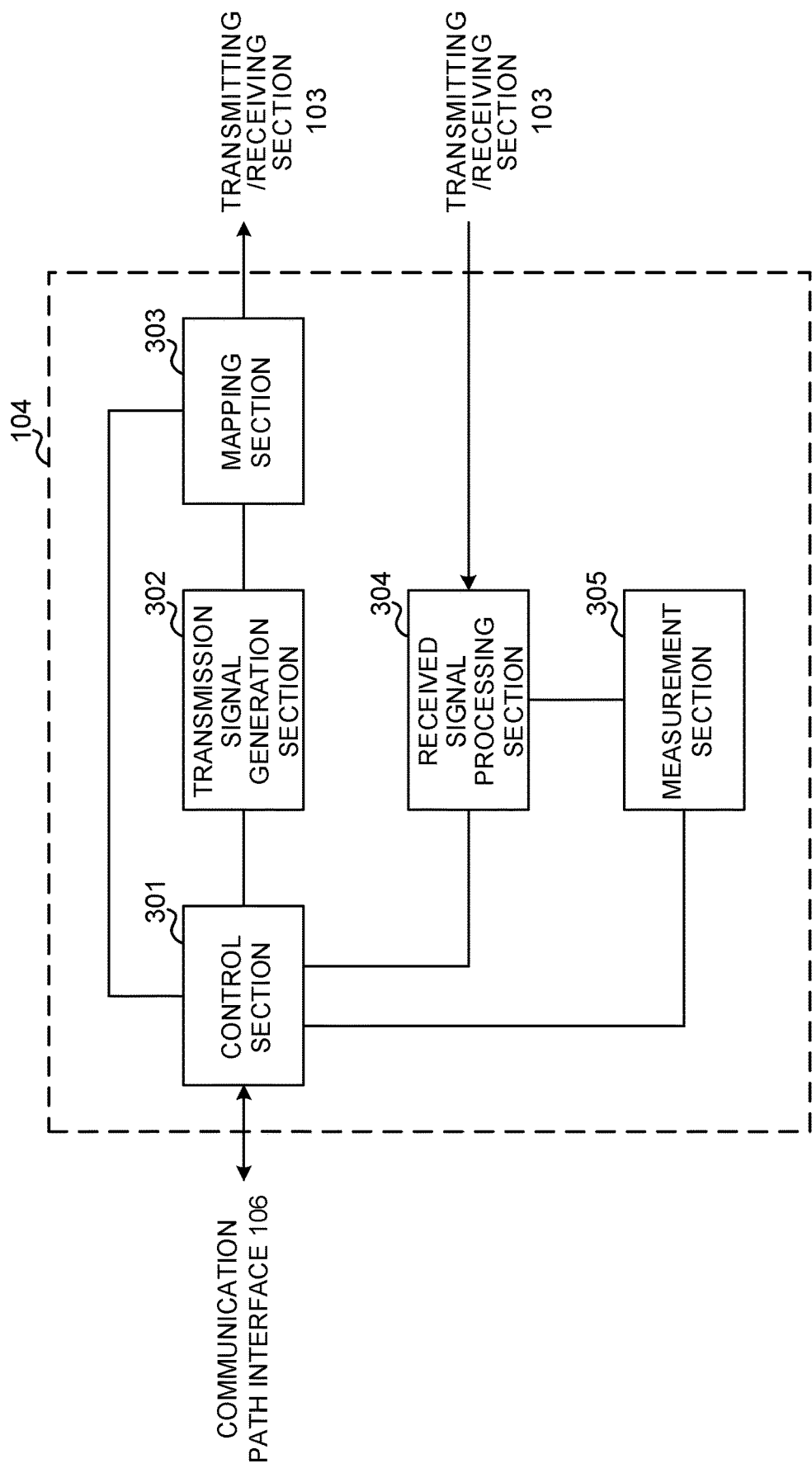
FIG. 8 is a diagram to show an example of a functional structure of a baseband signal processing section of the radio base station.

FIG. 8 is a diagram to show an example of a functional structure of the base station according to the present embodiment. The figure primarily shows functional blocks that pertain to characteristic parts of the present embodiment, and it is assumed that the base station 10 includes other functional blocks that are necessary for radio communication as well. The baseband signal processing section 104 at least includes a control section 301, a transmission signal generation section 302, a mapping section 303, a received signal processing section 304, and a measurement section 305.

The control section 301 controls the whole of the base station 10. The control section 301 can be constituted with a controller, a control circuit or control apparatus that can be described based on general understanding of the technical field to which the present invention pertains.

The control section 301, for example, controls the generation of signals in the transmission signal generation section 302 and the mapping of signals by the mapping section 303. The control section 301 controls the signal receiving processes in the received signal processing section 304 and the measurements of signals in the measurement section 305.

The control section 301 controls scheduling (for example, resource allocation) of downlink signals and uplink signals. Specifically, the control section 301 controls the transmission signal generation section 302, the mapping section 303, and the transmitting/receiving sections 103 so as to generate and transmit DCI (DL assignment, DL grant) including scheduling information of a downlink data channel and DCI (UL grant) including scheduling information of an uplink data channel.

The control section 301 may determine to switch TCI states for the PDCCH of a certain user terminal 20. The control section 301 may initiate an RRC reconfiguration procedure in order to switch beams. After completion of the RRC reconfiguration procedure, the control section 301 may perform control so as to transmit a PDCCH based on a new TCI state after switching to the user terminal 20.

The transmission signal generation section 302 generates downlink signals (downlink control channels, downlink data channels, downlink reference signals such as the DM-RS, and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present invention pertains.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. For example, the received signals are uplink signals (an uplink control channel, an uplink data channel, an uplink reference signal, and so on) that are transmitted from the user terminals 20. The received signal processing section 304 can be constituted with a signal processor, a signal processing circuit or signal processing apparatus that can be described based on general understanding of the technical field to which the present invention pertains.

The received signal processing section 304 outputs the decoded information acquired through the receiving processes to the control section 301. For example, the received processing section 304 outputs at least one of a preamble, control information, and UL data to the control section 301. The received signal processing section 304 outputs the received signals and the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present invention pertains.

The measurement section 305, for example, may measure received signal received power (for example, Reference Signal Received Power (RSRP)), received quality (for example, Reference Signal Received Quality (RSRQ)), a channel state, and so on. The measurement results may be output to the control section 301.

<User Terminal>

Figure 9:
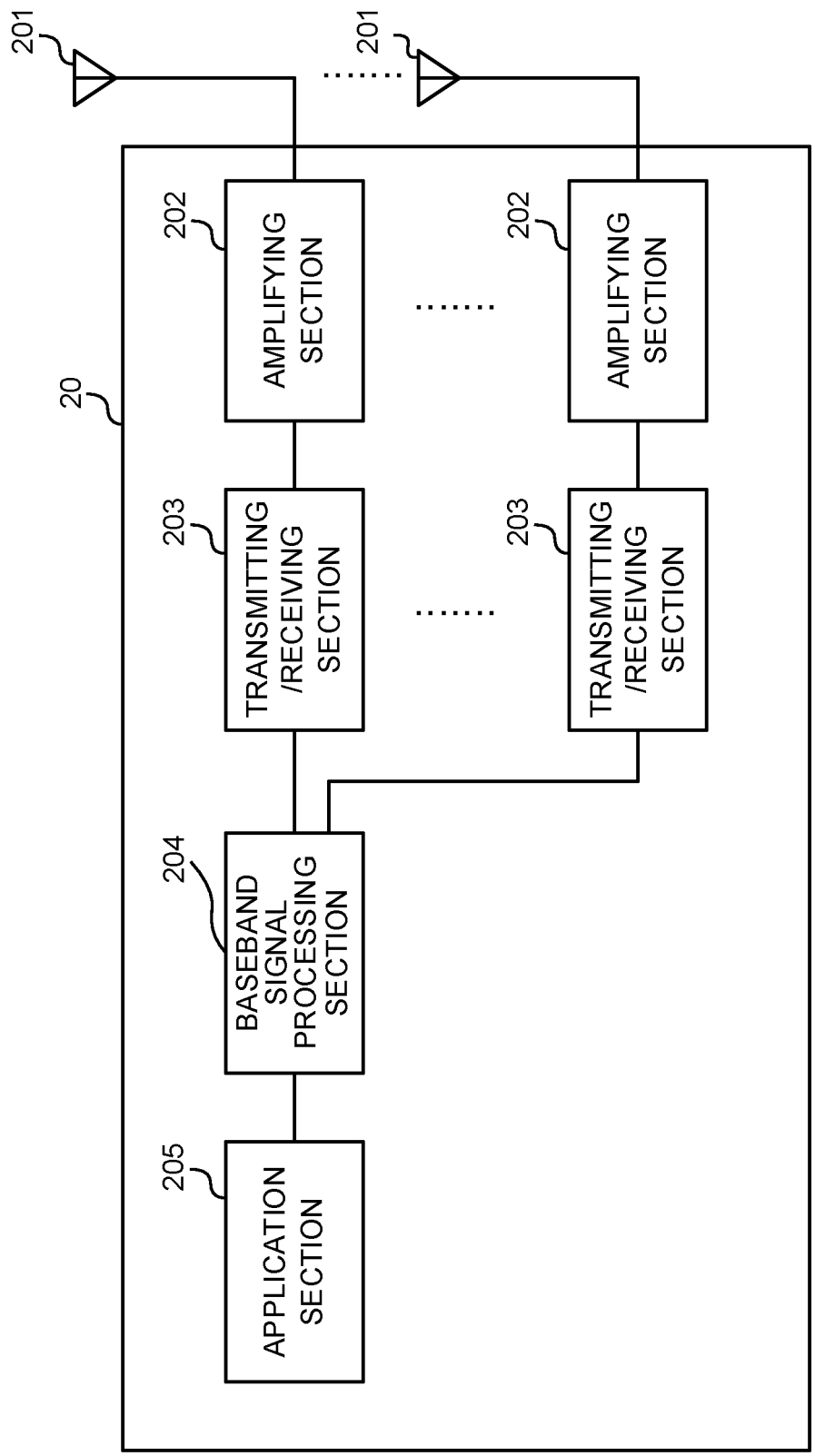
FIG. 9 is a diagram to show an example of a functional structure of a user terminal according to the present embodiment.

FIG. 9 is a diagram to show an example of an overall structure of the user terminal according to the present embodiment. A user terminal 20 includes a plurality of transmitting/receiving antennas 201, amplifying sections 202, transmitting/receiving sections 203, a baseband signal processing section 204 and an application section 205. The user terminal 20 may be configured to include one or more transmitting/receiving antennas 201, one or more amplifying sections 202 and one or more transmitting/receiving sections 203. The user terminal 20 may be a receiving apparatus for downlink data and a transmitting apparatus for uplink data.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present invention pertains. The transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink data is forwarded to the application section 205. The application section 205 performs processes related to higher layers above the physical layer and the MAC layer, and so on. System information and higher layer control information of the downlink data are also forwarded to the application section 205.

The uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving sections 203 may further include analog beamforming sections that perform analog beamforming. The analog beamforming sections can be constituted with analog beamforming circuits (for example, phase shifters and phase shift circuits) or analog beamforming apparatus (for example, phase shifting device) that can be described based on general understanding of the technical field to which the present invention pertains. The transmitting/receiving antennas 201 can be constituted with array antennas, for example. The transmitting/receiving sections 203 are configured to be capable of employing single BF and multi-BF.

The transmitting/receiving sections 203 may transmit signals by using transmit beams, and may receive signals by using receive beams. The transmitting/receiving sections 203 may transmit and receive signals by using certain beams that are determined by the control section 401.

The transmitting/receiving sections 203 receive downlink signals (for example, a downlink control signal (a downlink control channel), a downlink data signal (a downlink data channel, a downlink shared channel), a downlink reference signal (a DM-RS, a CSI-RS, and so on), a discovery signal, a synchronization signal, a broadcast signal, and so on). The transmitting/receiving sections 203 transmit uplink signals (for example, an uplink control signal (an uplink control channel), an uplink data signal (an uplink data channel, an uplink shared channel), an uplink reference signal, and so on).

The transmitting/receiving sections 203 may receive an RRC reconfiguration message, and may transmit an RRC reconfiguration complete message. The transmitting/receiving sections 203 may receive the PDCCH after transmission of the RRC reconfiguration complete message.

Figure 10:
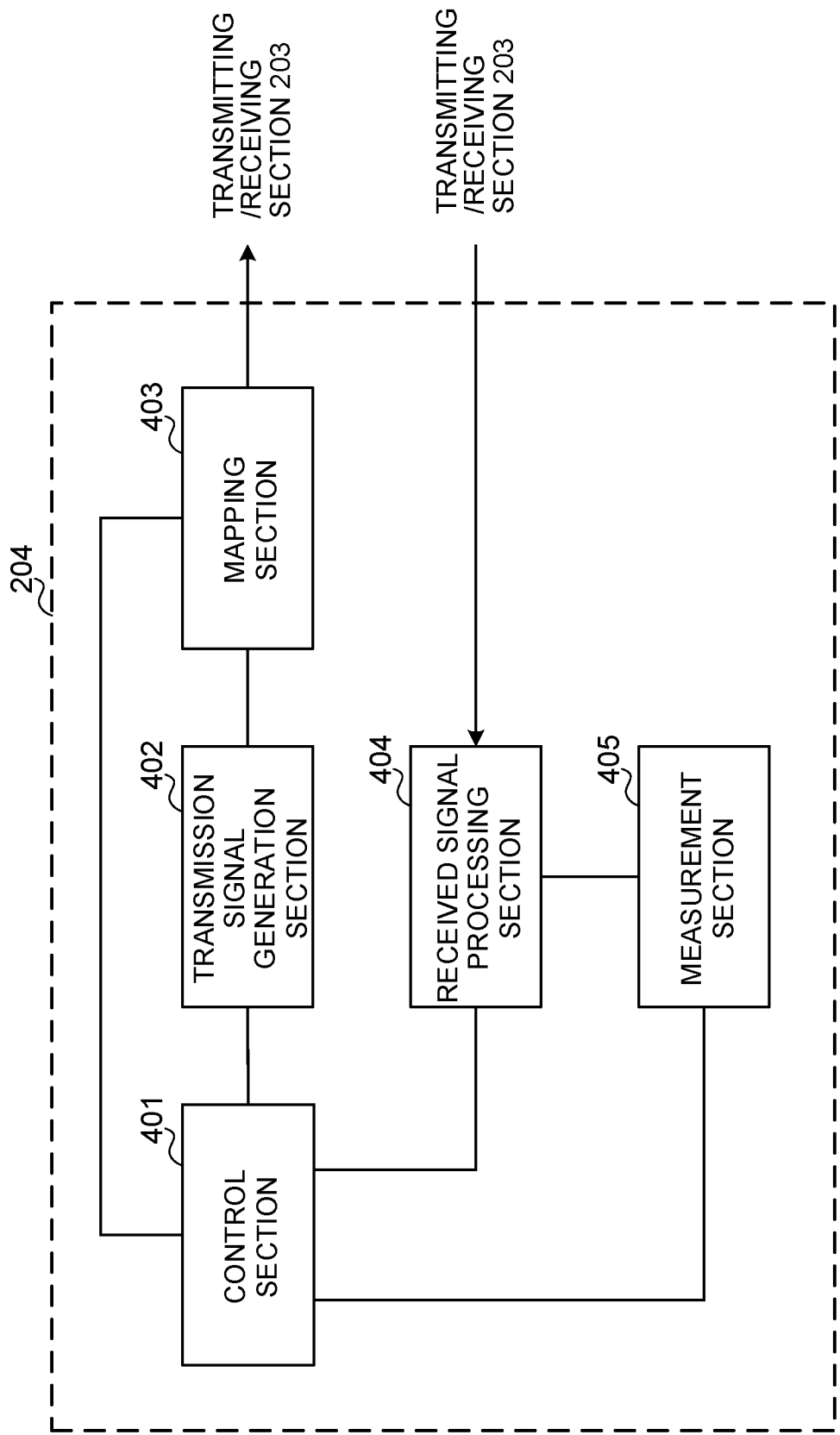
FIG. 10 is a diagram to show an example of a functional structure of a baseband signal processing section of the user terminal.

FIG. 10 is a diagram to show an example of a functional structure of the user terminal according to the present embodiment. The figure primarily shows functional blocks that pertain to characteristic parts of the present embodiment, and it is assumed that the user terminal 20 includes other functional blocks that are necessary for radio communication as well. The baseband signal processing section 204 provided in the user terminal 20 at least includes a control section 401, a transmission signal generation section 402, a mapping section 403, a received signal processing section 404 and a measurement section 405.

The control section 401 controls the whole of the user terminal 20. The control section 401 can be constituted with a controller, a control circuit or control apparatus that can be described based on general understanding of the technical field to which the present invention pertains.

The control section 401, for example, controls the generation of signals in the transmission signal generation section 402 and the mapping of signals by the mapping section 403. The control section 401 controls the signal receiving processes in the received signal processing section 404 and the measurements of signals in the measurement section 405.

When RRC reconfiguration involves a random access procedure, the control section 401 may assume that a synchronization signal block or a channel state information reference signal identified during the random access procedure and the PDCCH are quasi-co-located (QCL). When RRC reconfiguration does not involve a random access procedure, the control section 401 may assume that a certain beam in control elements notified in the RRC reconfiguration and the PDCCH are quasi-co-located (QCL). The control section 401 may assume that the certain beam has a TCI state provided based on the smallest ID of RRC control element "TCI-StatesPDCCH".

When RRC reconfiguration involves a random access procedure, the control section 401 may assume that a synchronization signal block or a channel state information reference signal identified during the random access procedure and the PUCCH are quasi-co-located (QCL). When RRC reconfiguration involves a random access procedure, the control section 401 may determine a beam to be used for transmission of the PUCCH by reusing a beam determination mechanism before the RRC reconfiguration.

The transmission signal generation section 402 generates uplink signals (uplink control channels, uplink data channels, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present invention pertains.

The transmission signal generation section 402 generates uplink data channels, based on commands from the control section 401. For example, when a UL grant is included in a downlink control channel that is reported from the base station 10, the control section 401 commands the transmission signal generation section 402 to generate the uplink data channel.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. For example, the received signals are downlink signals (a downlink control channel, a downlink data channel, a downlink reference signal, and so on) that are transmitted from the base station 10. The received signal processing section 404 can be constituted with a signal processor, a signal processing circuit or signal processing apparatus that can be described based on general understanding of the technical field to which the present invention pertains. The received signal processing section 404 can constitute the receiving section according to the present invention.

The received signal processing section 404 performs blind decoding of a downlink control channel for scheduling transmission and reception of a downlink data channel based on commands from the control section 401, and performs receiving processes for the downlink data channel based on the DCI. The received signal processing section 404 estimates a channel gain based on a DM-RS or a CRS, and demodulates the downlink data channel, based on the estimated channel gain.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 may output decoding results of data to the control section 401. The received signal processing section 404 outputs the received signals and the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present invention pertains.

The measurement section 405, for example, may measure received power of received signal (for example, RSRP), DL received quality (for example, RSRQ), a channel state, and so on. The measurement results may be output to the control section 401.

(Hardware Structure)

The block diagrams that have been used to describe the above embodiments show blocks in functional units. These functional blocks (components) may be implemented in arbitrary combinations of at least one of hardware and software. The method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, a functional block (components) to implement a function of transmission may be referred to as a "transmitting section (transmitting unit)," a "transmitter," and the like. The method for implementing each component is not particularly limited as described above.

Figure 11:
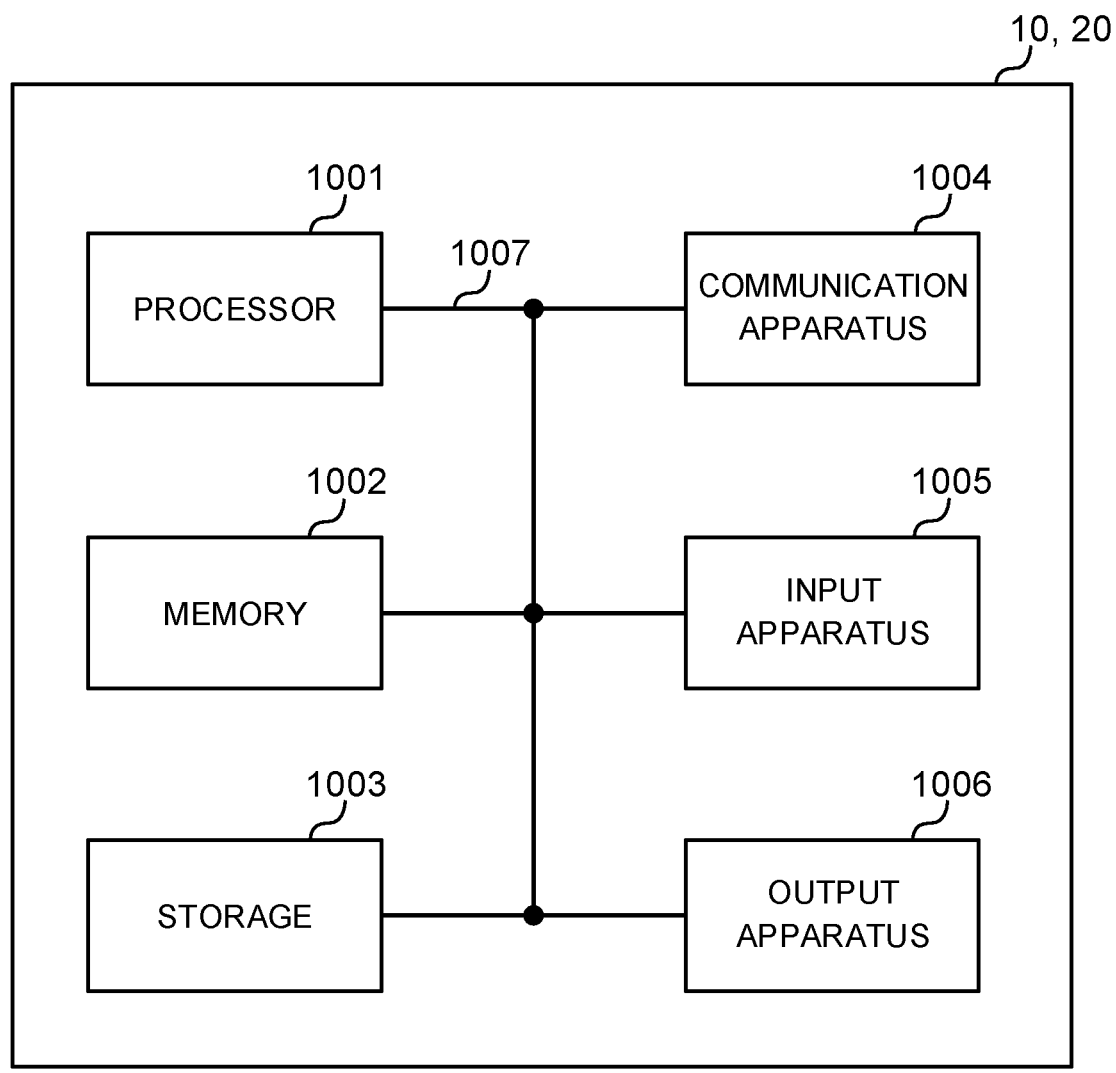
FIG. 11 is a diagram to show an example of a hardware structure of the radio base station and the user terminal according to one embodiment of the present invention.

For example, a base station, a user terminal, and so on according to one embodiment of the present disclosure may function as a computer that executes the processes of the radio communication method of the present disclosure. FIG. 11 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

In the following description, the word "apparatus" may be interpreted as "circuit," "device," "unit," and so on. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Processes may be implemented with one processor or may be implemented at the same time, in sequence, or in different manners with two or more processors. The processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

The processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004. In the transmitting/receiving section 103, the transmitting section 103a and the receiving section 103b can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). The input apparatus 1005 and the output apparatus 1006 may be provided in an integrated structure (for example, a touch panel).

These types of apparatus, including the processor 1001, the memory 1002, and others, are connected by a bus 1007 for communicating information. The bus 1007 may be formed with a single bus, or may be formed with buses that vary between pieces of apparatus.

The base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

The terminology described in the present disclosure and the terminology that is needed to understand the present disclosure may be replaced by other terms that convey the same or similar meanings. For example, at least one of a channel and a symbol may be a signal (signaling). "Signals" may be "messages." A reference signal may be abbreviated as an "RS," and may be referred to as a "pilot," a "pilot signal," and so on, depending on which standard applies. A "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filtering processing performed by a transceiver in the frequency domain, a particular windowing processing performed by a transceiver in the time domain, and so on.

A slot may be constituted of one or a plurality of symbols in the time domain, for example, Orthogonal Frequency Division Multiplexing (OFDM) symbols, Single Carrier Frequency Division Multiple Access (SC-FDMA) symbols, and so on. A slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms.

For example, one subframe may be referred to as a "transmission time interval (TTI)," a plurality of consecutive subframes may be referred to as a "TTI" or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. A unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmission power that are available for each user terminal) for the user terminal in TTI units. The definition of ITIs is not limited to this.

TTIs may be transmission time units for channel-encoded data packets (transport blocks), code blocks, codewords, and so on, or may be the unit of processing in scheduling, link adaptation, and so on. When ITIs are given, the time interval (for example, the number of symbols) to which transport blocks, code blocks, codewords, or the like are actually mapped may be shorter than the TTIS.

In the case where one slot or one mini-slot is referred to as a TTI, one or more ITIs (that is, one or more slots or one or more mini-slots) may be the minimum time unit of scheduling. The number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

A long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain.

A resource block (RB) may include one or a plurality of symbols in the time domain, and may be one slot, one mini-slot, one subframe, or one TTI in length. One TTI and one subframe each may be constituted of one or a plurality of resource blocks.

One or a plurality of resource blocks (RBs) may be referred to as a "physical resource block (Physical RB (PRB))," a "sub-carrier group (SCG)," a "resource element group (REG)," a "PRB pair," an "RB pair" and so on.

A resource block may be constituted of one or a plurality of resource elements (REs). For example, one RE may correspond to a radio resource field of one subcarrier and one symbol.

The above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and resource blocks (RBs) included in a slot or a mini-slot, the number of subcarriers included in a resource block (RB), the number of symbols in a TTI, the symbol length, the cyclic prefix (CP) length, and so on can be variously changed.

The information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels, such as a Physical Uplink Control Channel (PUCCH) and a Physical Downlink Control Channel (PDCCH), and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), MAC (Medium Access Control) signaling and so on), and other signals and/or combinations of these.

Physical layer signaling may be referred to as "L1/L2 (Layer 1/Layer 2) control information (L1/L2 control signals)," "L1 control information (L1 control signal)," and so on. RRC signaling may be referred to as an "RRC message," and can be, for example, an RRC connection setup (RRC-ConnectionSetup) message, an RRC connection reconfiguration (RRCConnectionReconfiguration) message, and so on. MAC signaling may be reported using, for example, MAC control elements (MAC CEs).

Reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure may be used interchangeably.

In the present disclosure, the terms such as "precoding," a "precoder," a "weight (precoding wait)," "quasi-co-location (QCL)," a "TCI state (Transmission Configuration Indication state)," a "spatial relation," a "spatial domain filter," a "transmission power," "phase rotation," an "antenna port," an "antenna port group," a "layer," "the number of layers," a "rank," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNodeB (eNB)," a "gNodeB (gNB)," an "access point," a "transmission point," a "reception point," a "transmission/reception point," a "cell," a "sector," a "cell group," a "carrier," a "component carrier," a "bandwidth part (BWP)," and so on can be used interchangeably. The base station may be referred to as the terms such as a "macro cell," a small cell," a "femto cell," a "pico cell," and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," "terminal" and so on may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "communication apparatus," and so on. At least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). At least one of a base station and a mobile station also includes an apparatus which does not necessarily move during communication operation. For example, at least one of a base station and a mobile station may be an IoT (Internet of Things) device such as a sensor, and the like.

The base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "D2D (Device-to-Device)," "V2X (Vehicle-to-Everything)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and next-generation systems that are enhanced based on these, for example. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

"Judging (determining)" may be interpreted to mean making "judgments (determinations)" about receiving (for example, receiving information), transmitting (for example, transmitting information), input, output, accessing (for example, accessing data in a memory), and so on.

"Judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

"Judging (determining)" may be interpreted as "assuming," "expecting," "considering," and the like.

The "maximum transmission power" according to the present disclosure may mean a maximum value of the transmission power, may mean the nominal maximum transmission power (the nominal UE maximum transmit power), or may mean the rated maximum transmission power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables, printed electrical connections, and so on, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." The terms "separate," "be coupled" and so on may be interpreted similarly.

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
    a processor that,
        when a single transmission configuration indicator (TCI) state is configured, by radio resource control (RRC) signaling, for a control resource set (CORESET) other than a CORESET with an index of 0, assumes that the single TCI state corresponds to the CORESET other than the CORESET with the index of 0, and
        when a plurality of TCI states is configured, by RRC signaling, for the CORESET other than the CORESET with the index 0 in an RRC reconfiguration, in response not to activate any one of the plurality of TCI states by a Medium Access Control Control Element (MAC CE) activation command for the CORESET other than the CORESET with the index of 0, assumes that a demodulation reference signal (DMRS) antenna port associated with a physical downlink control channel (PDCCH) is quasi co-located with a synchronization signal block identified during a random access procedure during the RRC reconfiguration or a channel state information reference signal identified during the random access procedure during the RRC reconfiguration; and
    a receiver that receives the PDCCH,
    wherein, when the single TCI state is configured for the CORESET other than the CORESET with the index of 0, the processor assumes that the DMRS antenna port associated with the PDCCH is quasi co-located with the single TCI state and the receiver receives the PDCCH.

2. The terminal according to claim 1, wherein if the random access procedure is not initiated in the RRC reconfiguration, the processor assumes that the DMRS antenna port associated with the PDCCH is quasi co-located with a specified beam within a control element that is notified by the RRC reconfiguration.

3. The terminal according to claim 2, wherein the specified beam is provided by a minimum ID within the control element.

4. The terminal according to claim 1, wherein when an RRC reconfiguration not involving a related random access procedure is employed, the processor follows a latest MAC CE indicating the TCI state for the PDCCH within a CORESET other than the CORESET with the index of 0 for the QCL assumption for the PDCCH.

5. A radio communication method for a terminal comprising:
when a single transmission configuration indicator (TCI) state is configured, by radio resource control (RRC) signaling, for a control resource set (CORESET) other than a CORESET with an index of 0, assuming that the single TCI state corresponds to the CORESET other than the CORESET with the index of 0; and
when a plurality of TCI states is configured, by RRC signaling, for the CORESET other than the CORESET with the index 0 in an RRC reconfiguration, in response not to activate any one of the plurality of TCI states by a Medium Access Control Control Element (MAC CE) activation command for the CORESET other than the CORESET with the index of 0, assuming that a demodulation reference signal (DMRS) antenna port associated with a physical downlink control channel (PDCCH) is quasi co-located with a synchronization signal block identified during a random access procedure during the RRC reconfiguration or a channel state information reference signal identified during the random access procedure during the RRC reconfiguration; and
receiving the PDCCH,
wherein, when the single TCI state is configured for the CORESET other than the CORESET with the index of 0, the terminal assumes that the DMRS antenna port associated with the PDCCH is quasi co-located with the single TCI state and the terminal receives the PDCCH.

6. A base station comprising:
a processor that initiates a radio resource control (RRC) reconfiguration procedure; and
a transmitter that,
when a single transmission configuration indicator (TCI) state is configured, by radio resource control (RRC) signaling, for a control resource set (CORESET) other than a CORESET with an index of 0, transmits a physical downlink control channel (PDCCH) to the terminal that assumes that the single TCI state corresponds to the CORESET other than the CORESET with the index of 0, and
when a plurality of TCI states is configured, by RRC signaling, for the CORESET other than the CORESET with the index 0 in an RRC reconfiguration, in response not to activate any one of the plurality of TCI states by a Medium Access Control Control Element (MAC CE) activation command for the CORESET other than the CORESET with the index of 0, transmits a PDCCH to the terminal that assumes that a demodulation reference signal (DMRS) antenna port associated with the PDCCH is quasi co-located with a synchronization signal block identified during a random access procedure during the RRC reconfiguration or a channel state information reference signal identified during the random access procedure during the RRC reconfiguration,
wherein, when the single TCI state is configured for the CORESET other than the CORESET with the index of 0, the transmitter transmits the PDCCH to the terminal that assumes that the DMRS antenna port associated with the PDCCH is quasi co-located with the single TCI state.

7. A system comprising a base station and a terminal, wherein:
the base station comprising:
a first processor that initiates a radio resource control (RRC) reconfiguration procedure;
the terminal comprising:
a second processor that,
when a single transmission configuration indicator (TCI) state is configured, by radio resource control (RRC) signaling, for a control resource set (CORESET) other than a CORESET with an index of 0, assumes that the single TCI state corresponds to the CORESET other than the CORESET with the index of 0, and
when a plurality of TCI states is configured, by RRC signaling, for the CORESET other than the CORESET with the index 0 in an RRC reconfiguration, in response not to activate any one of the plurality of TCI states by a Medium Access Control Control Element (MAC CE) activation command for the CORESET other than the CORESET with the index of 0, assumes that a demodulation reference signal (DMRS) antenna port associated with a physical downlink control channel (PDCCH) is quasi co-located with a synchronization signal block identified during a random access procedure during the RRC reconfiguration or a channel state information reference signal identified during the random access procedure during the RRC reconfiguration; and
a receiver that receives the PDCCH,
wherein, when the single TCI state is configured for the CORESET other than the CORESET with the index of 0, the second processor assumes that the DMRS antenna port associated with the PDCCH is quasi co-located with the single TCI state and the receiver receives the PDCCH.

* * * * *